United States Patent [19]
Gaitros et al.

[11] Patent Number: 5,743,571
[45] Date of Patent: Apr. 28, 1998

[54] FITTING WITH FLOATING TUBE SUPPORT AND METHOD OF MANUFACTURE

[75] Inventors: Charles Gaitros, Old Fort; Daniel Stephens, Clyde, both of Ohio

[73] Assignee: Seawin, Inc., Fremont, Ohio

[21] Appl. No.: 800,564

[22] Filed: Feb. 18, 1997

[51] Int. Cl.⁶ .................................................. F16L 35/00
[52] U.S. Cl. ........................ 285/39; 285/382; 29/509; 29/511; 29/520
[58] Field of Search ................. 285/382, 39, 509, 285/511, 520

[56] References Cited

U.S. PATENT DOCUMENTS

| | | |
|---|---|---|
| 1,672,879 | 6/1928 | Campbell, Jr. . |
| 1,921,709 | 8/1933 | Stecher . |
| 2,001,204 | 5/1935 | Long et al. . |
| 2,090,251 | 8/1937 | Cowles . |
| 2,281,973 | 5/1942 | Healy ................. 285/382 X |
| 2,498,395 | 2/1950 | Coss ..................... 285/382 X |
| 3,374,014 | 3/1968 | Kull et al. . |
| 3,888,523 | 6/1975 | Bartholomew ............ 285/382 |
| 3,902,746 | 9/1975 | Brandt . |
| 4,135,288 | 1/1979 | Pitschi . |
| 4,824,388 | 4/1989 | Pickel . |
| 4,932,114 | 6/1990 | Morse et al. . |

FOREIGN PATENT DOCUMENTS 806481  12/1958  United Kingdom ................ 285/382

*Primary Examiner*—Dave W. Arola
*Attorney, Agent, or Firm*—Renner, Otto, Boisselle & Sklar, P.L.L.

[57] ABSTRACT

A fitting includes a stepped passage having a pair of axially spaced apart shoulders, one of which acts as a stop shoulder preventing a bell shaped end of a tube support from being inserted past the stop shoulder, and the other of which has a trepan formed therein which is deformed radially inwardly to wrap around the bell shaped end portion. The trepan has a generally triangular shape cross section including an axial inner wall in alignment with the outer diameter of the stop shoulder and a tapered outer wall intersecting the inner wall at an acute angle. In one form of the invention, the entire outer edge of the trepan is deformed radially inwardly to form an inturned lip that wraps around the bell shaped end portion of the tube support. In another form of the invention, a plurality of circumferentially spaced segments of the outer edge of the trepan are deformed radially inwardly to form individual fingers that wrap around the bell shaped end portion of the tube support.

13 Claims, 2 Drawing Sheets

FITTING WITH FLOATING TUBE SUPPORT AND METHOD OF MANUFACTURE

FIELD OF THE INVENTION

The present invention relates to a fitting in which a tube support is held captive while allowing the outer end of the tube support to move laterally (e.g., float) within the fitting.

BACKGROUND OF THE INVENTION

For certain types of fittings with tube supports to work properly, the outer end of the tube support must be free to move laterally (e.g., float) within the fitting while retaining the tube support against removal therefrom. Previously this was done by machining a small recess or groove in the inner wall of the fitting in the plane of a stop shoulder and then forcing a bell shaped end of the tube support against the shoulder with pressure to expand the bell shaped end into the recess.

A drawback to this particular assembly procedure is that it is difficult to machine the narrow recess, particularly when the machining tool is rotated and the fitting is held motionless. Even when the fitting is rotated, the recessing presents some problems. Also, the bottom of the recess has to be a virtually flat and smooth continuation of the stop shoulder on the fitting or the bell shaped end of the tube support will not expand into the recess to retain the tube support in place within the fitting.

SUMMARY OF THE INVENTION

The aforementioned problems are eliminated in accordance with the present invention by providing a fitting that does not require any complicated recessing or further belling out of the bell shaped end of the tube support into a recess for retaining the tube support within the fitting.

In accordance with one aspect of the invention, the fitting includes a stepped passage having axially spaced apart shoulders, one of which acts as a stop shoulder preventing the bell shaped end portion of the tube support from being inserted past the stop shoulder, and the other of which includes a trepan formed thereon having an inner diameter greater than the outer diameter of the bell shaped end portion of the tube support to permit insertion of the end portion past the trepan.

In accordance with another aspect of the invention, the trepan has a triangular shape cross section including an axial inner wall in alignment with the outer diameter of the stop shoulder and a tapered outer wall intersecting the inner wall at an acute angle.

In accordance with another aspect of the invention, the taper of the outer wall of the trepan extends the full radial extent of the larger diameter shoulder.

In accordance with another aspect of the invention, after the end portion of the tube support is inserted past the trepan, the trepan is staked over to form an inturned lip that wraps around the bell shaped end portion of the tube support, preventing the tube support from being axially withdrawn from the fitting while permitting the outer end of the tube support to move laterally within a larger diameter portion of the passage.

In accordance with another aspect of the invention, an axial force is applied against the entire tapered outer wall of the trepan during the staking operation to cause the entire outer periphery of the trepan to deform radially inwardly to form an inturned lip that wraps around the bell shaped end portion of the tube support.

In accordance with another aspect of the invention, in an alternative embodiment, a plurality of circumferentially spaced segments of the outer edge of the trepan are deformed radially inwardly to form a plurality of fingers in the outer edge of the trepan that wrap around the bell shaped end of the tube support to retain the tube support within the fitting.

These and other advantages, features and aspects of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
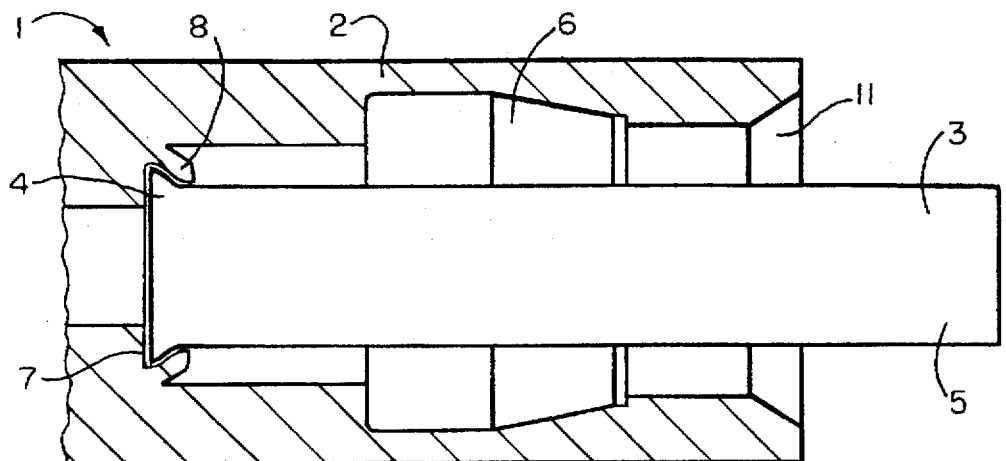
FIG. 1 is a fragmentary longitudinal section through one form of fitting in accordance with the present invention including a trepan which has been deformed radially inwardly to wrap around a bell shaped end portion of a tube support to hold the tube support captive within the fitting while allowing the outer end of the tube support to move laterally within the fitting.

Referring now in detail to the drawings, and initially to FIG. 1, there is shown a preferred form of fitting 1 in accordance with the invention including a body 2 in which a tube support 3 is retained at its inner end 4 in such a manner as to allow the outer end 5 of the tube support to move laterally within the fitting (e.g., float) as described hereafter. A longitudinal passage 6 extends through the body 2. At one point along the length of the passage 6 is a stop shoulder 7 extending perpendicular to the longitudinal axis of the passage. The stop shoulder 7 is dimensioned to prevent the inner end 4 of the tube support, which is bell shaped, from being inserted past the stop shoulder. The outermost diameter of the bell shaped end portion 4 of the tube support 3 is less than the inner diameter of another shoulder 9 in the passage 6 axially outwardly spaced from the stop shoulder 7. Also, the axial spacing between the inner end 4 of the tube support 3 and the axial outermost end of the bell shaped end portion is less than the axial spacing between the stop shoulder 7 and other shoulder 9, whereby the bell shaped end portion is trapped between the stop shoulder 7 and a trepan 8 formed in the larger diameter shoulder 9 which has been deformed radially inwardly to form an inturned lip that wraps around the axial outermost end of the bell shaped end portion during the manufacturing process, sequentially shown in FIGS. 2 through 5. When thus deformed, the trepan 8 prevents the tube support from being axially withdrawn from the fitting while permitting limited axial movement of the outer end 5 of the tube support within the larger diameter portion 11 of the passage 6.

Figure 2:
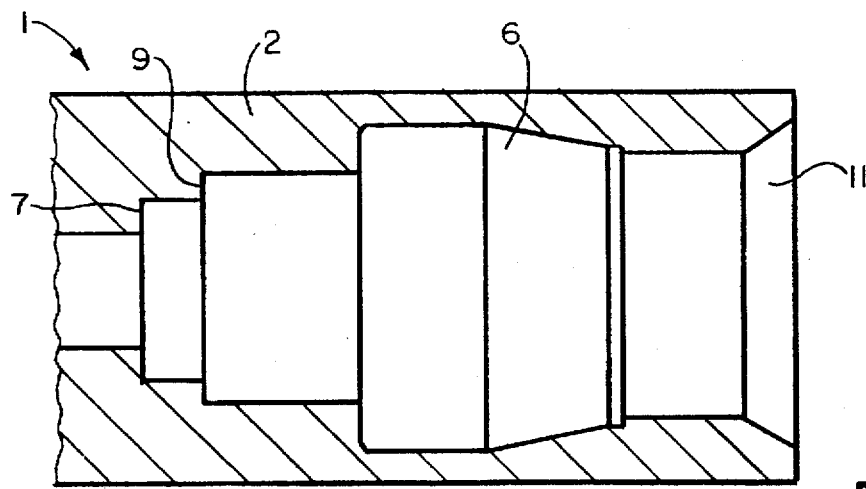
FIGS. 2 through 5 are fragmentary longitudinal sections through a fitting showing sequentially how a trepan is formed in the fitting and then deformed radially inwardly to form an inturned lip that wraps around a bell shaped end portion of the tube support.

FIG. 2 shows the larger diameter shoulder 9 axially spaced from the stop shoulder 7 with its inner diameter corresponding to the outer diameter of the stop shoulder prior to forming the trepan 8 in the shoulder.

Figure 3:
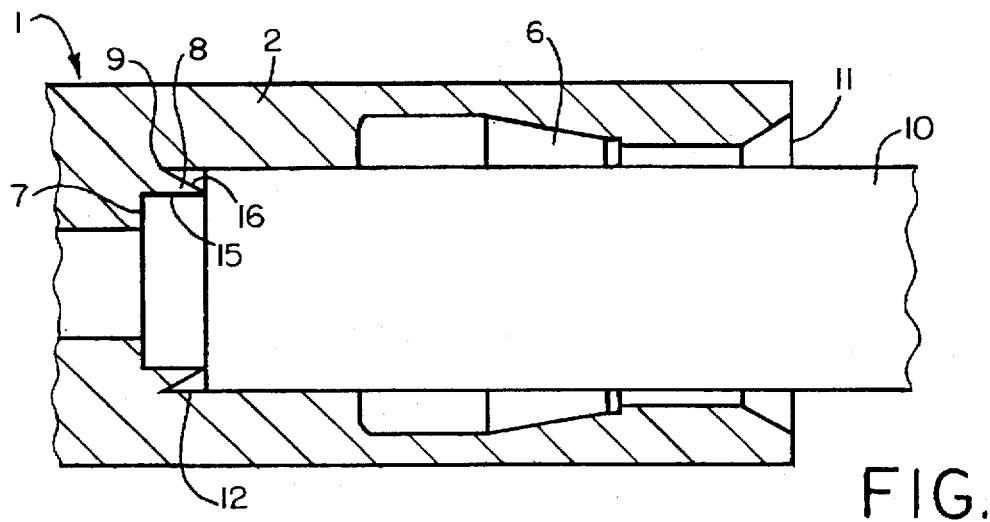

FIG. 3 shows a trepanning tool 10 inserted into the larger diameter portion 11 of the passage 6. At the inner end of the trepanning tool are triangularly shape cutting teeth 12 for forming the trepan 8 in the shoulder 9, such trepan having a triangular shape cross section including an axial inner wall 15 in line with the outer diameter of the stop shoulder 7 and a tapered outer wall 16 intersecting the inner wall 15 at an acute angle.

Figure 4:
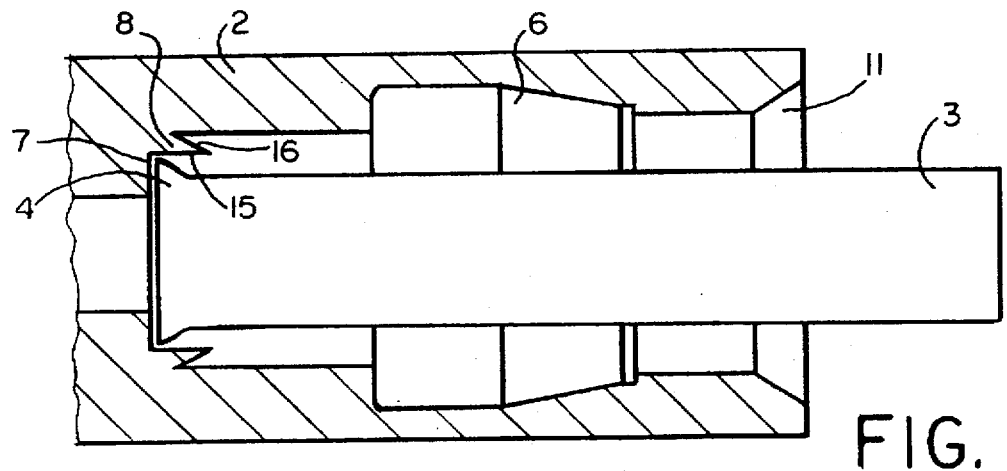
Figure 5:
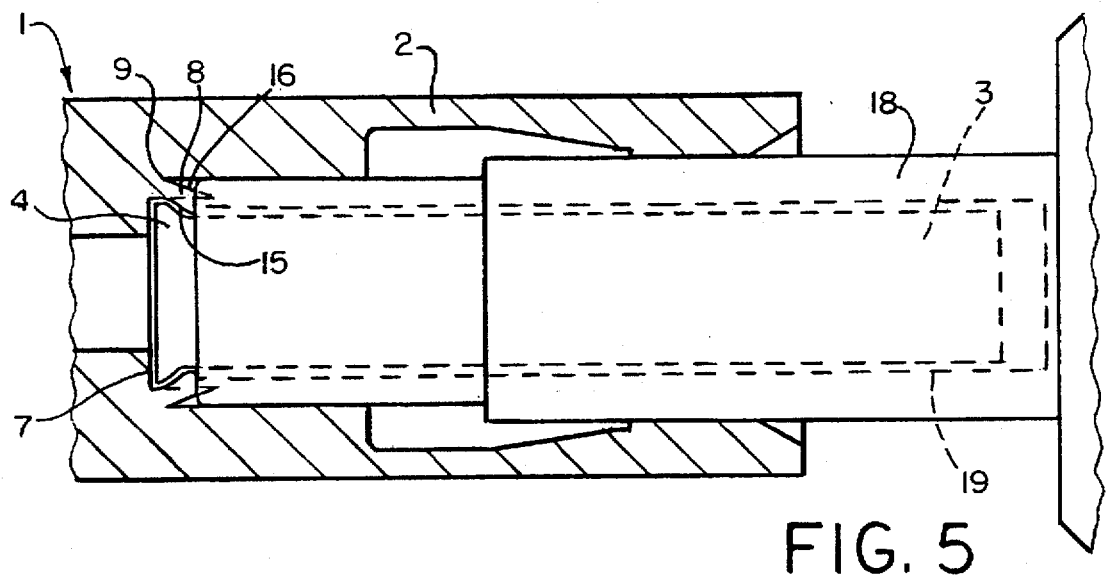

The inner diameter of the trepan 8 (before the staking operation) corresponds to the outer diameter of the stop shoulder 7, whereby the bell shaped end portion 4 of the tube support 3 is free to be inserted past the trepan 8 and up against the stop shoulder 7 as schematically shown in FIG. 4. Thereafter, a staking tool 18, schematically shown in FIG. 5, is inserted into the larger diameter portion 11 of the passage 6 and forced up against the tapered outer wall 16 of the trepan 8. The staking tool 18 has a flat end that applies an axial force to such outer wall 16. This causes the entire outer periphery of the trepan 8 to deform radially inwardly (from the phantom line position to the solid line position shown in FIG. 5) to form an inturned lip that wraps around the bell shaped end portion 4 of the tube support 3, preventing the tube support from being axially withdrawn from the fitting while permitting the outer end of the tube support to move laterally within the larger diameter portion 11 of the passage. Providing the trepan 8 with a generally triangular shape cross section has the advantage that it is relatively easy to deform the trepan radially inwardly without having to rotate the staking tool as it is forced axially inwardly against the outer tapered wall of the trepan. However, it should be understood that the staking tool could be rotated to obtain a similar result if desired. A central recess 19 in the staking tool 18 is dimensioned to accommodate the outer end of the tube support 3 during the staking operation.

Figure 6:
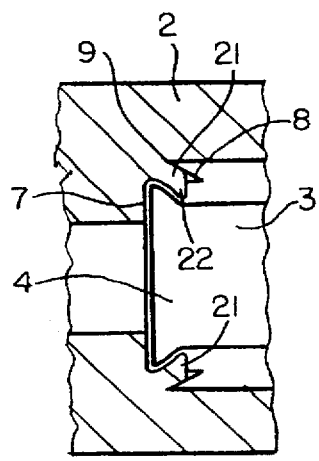
FIG. 6 is a fragmentary longitudinal section showing a modified form of fitting in accordance with the invention in which the tube support is held captive by a plurality of fingers in the outer edge of the trepan that wrap around the bell shaped end portion of the tube support.
Figure 7:
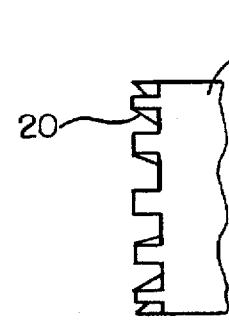
FIG. 7 is an enlarged fragmentary side elevation view of a trepanning tool having a plurality of circumferentially spaced teeth used to form the fingers in the outer edge of the trepan as shown in FIG. 6.
Figure 8:
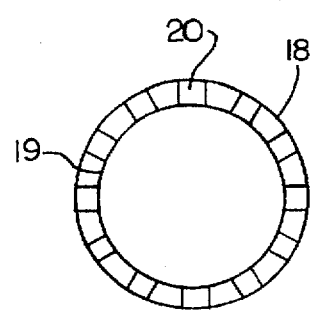
FIG. 8 is an end elevation view of the trepanning tool of FIG. 7 as viewed from the left end thereof.

If desired, the staking tool 18 may be provided with a plurality of circumferentially spaced teeth 20, schematically shown in FIGS. 7 and 8, which produce a plurality of circumferentially spaced segments 21 in the outer edge of the trepan 8 that form a plurality of fingers 22 that wrap around the bell shaped end of the tube support for retaining the tube support within the fitting as schematically shown in FIG. 6.

From the foregoing, it will be apparent that the fitting and method of making of the present invention uses trepanning that requires no complicated recessing in the fitting passage, and involves a subsequent staking operation to retain the tube support within the fitting without the need to further bell out the bell shaped end portion of the tube support.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A fitting comprising a body having a longitudinal passage, said passage having a stop shoulder extending perpendicular to the longitudinal axis of said passage and an other shoulder axially outwardly spaced from said stop shoulder, said other shoulder having an inner diameter substantially corresponding to the outer diameter of said stop shoulder, a tube support having one end engageable with said stop shoulder, a radially outwardly protruding flange adjacent said one end of said tube support, the outermost diameter of said flange being less than the inner diameter of said other shoulder and the axial spacing between said one end of said tube support and the axial outermost end of said flange being less than the axial spacing between said stop shoulder and said other shoulder, and a trepan formed in said other shoulder, said trepan being deformed radially inwardly into overlying relation with the axial outermost end of said flange on said tube support for trapping said flange between said stop shoulder and said trepan.

2. The fitting of claim 1 wherein said trepan, prior to being deformed, has a generally triangular shaped cross section including an inner wall having a diameter corresponding to the inner diameter of said other shoulder, and a tapered outer wall that extends substantially the full radial extent of said other shoulder and intersects said inner wall at an acute angle.

3. The fitting of claim 2 wherein said trepan is deformed radially inwardly around its entire circumference into overlying relation with the axial outermost end of said flange.

4. The fitting of claim 2 wherein a plurality of circumferentially spaced segments in the axial outermost end of said trepan are deformed radially inwardly to form fingers in overlying relation with the axial outermost end of said flange.

5. The fitting of claim 1 wherein said flange is bell shaped, and said trepan is deformed into overlying relation around the axial outermost end of said bell shaped flange.

6. The fitting of claim 5 wherein said trepan has a generally triangular shaped outer edge which is deformed radially inwardly to form an inturned lip that wraps around the axial outermost end of said bell shaped flange.

7. The fitting of claim 5 wherein said trepan has a generally triangular shaped outer edge, and there are a plurality of circumferentially spaced segments in said outer edge forming fingers that wrap around the axial outermost end of said bell shaped flange.

8. A method of attaching a tube support within a passage in a fitting, the passage having a stop shoulder extending perpendicular to the longitudinal axis of the passage and an other shoulder axially outwardly spaced from the stop shoulder, the other shoulder having an inner diameter substantially corresponding to the outer diameter of the stop shoulder, and the tube support having a radially outwardly extending flange adjacent one end, the outermost diameter of the flange being less than the inner diameter of the other shoulder, and the axial spacing between the one end of the tube support and the axial outermost end of the flange being less than the axial spacing between the stop shoulder and the other shoulder, comprising the steps of inserting the flanged end of the tube support into the passage past such other shoulder and into engagement with the stop shoulder, inserting a staking tool into the passage to deform a trepan on the other shoulder radially inwardly into overlying relation with the axial outermost end of the flange for trapping the flange between the stop shoulder and the deformed trepan, and removing the staking tool from the passage.

9. The method of claim 8 wherein the trepan is formed in the other shoulder prior to inserting the flanged end of the tube support into the passage in the fitting.

10. The method of claim 9 wherein the trepan is formed into a generally triangular shaped cross section including an inner wall having a diameter corresponding to the inner diameter of the other shoulder, and a tapered outer wall that extends substantially the full radial extent of the other shoulder and intersects the inner wall at an acute angle.

11. The method of claim 8 wherein the flanged end of the tube support is bell shaped, and the trepan is deformed radially inwardly by the staking tool causing the trepan to wrap around the axial outermost end of the bell shaped flange.

12. The method of claim 11 wherein the trepan is formed with a generally triangular shaped outer edge that is deformed radially inwardly to form an inturned lip that wraps around the axial outermost end of the bell shaped flange.

13. The method of claim 11 wherein the trepan is formed with a generally triangular shaped outer edge, and the staking tool has a plurality of circumferentially spaced teeth that produce a plurality of circumferentially spaced segments in the outer edge of the trepan that are deformed radially inwardly by the staking tool to form a plurality of fingers that wrap around the axial outermost end of the bell shaped flange.

* * * * *